(12) United States Patent
Ijiri (10) Patent No.: US 6,453,688 B1
(45) Date of Patent: Sep. 24, 2002

(54) IDLING ENGINE SPEED CONTROL APPARATUS (75) Inventor: Makoto Ijiri, Chiba (JP)

(73) Assignee: Seiko Seiki Kabushiki Kaisha, Narashino (JP)

( * ) Notice: Subject to any disclaimer, the term of this patent is extended or adjusted under 35 U.S.C. 154(b) by 0 days.

(21) Appl. No.: 09/520,550

(22) Filed: Mar. 8, 2000

(30) Foreign Application Priority Data

Mar. 10, 1999 (JP) .......................................... 11-063828

(51) Int. Cl.⁷ ................................................ B60H 1/32
(52) U.S. Cl. ...................................................... 62/153
(58) Field of Search ...................... 62/133, 132, 228.5, 62/228.3, 228.4; 417/222.2, 295, 310

(56) References Cited

U.S. PATENT DOCUMENTS

| | | | | |
|---|---|---|---|---|
| 4,366,003 A | * | 12/1982 | Korte et al. | 134/18 |
| 4,856,291 A | | 8/1989 | Takahashi | |
| 4,969,334 A | * | 11/1990 | Goubeaux et al. | 62/133 |
| 4,976,589 A | | 12/1990 | Ide | |
| 5,129,791 A | * | 7/1992 | Nakajima | 417/295 |
| 5,199,272 A | | 4/1993 | Yamanaka et al. | |
| 5,209,081 A | * | 5/1993 | Matsuoka | 62/244 |
| 5,924,296 A | * | 7/1999 | Takano et al. | 62/133 |
| 6,145,329 A | * | 11/2000 | Brandon et al. | 62/133 |
| 6,149,398 A | * | 11/2000 | Fukanuma et al. | 417/222.2 |
| 6,192,699 B1 | * | 2/2001 | Kato et al. | 62/228.3 |

FOREIGN PATENT DOCUMENTS

| | | |
|---|---|---|
| EP | 0-645539 | 3/1995 |
| JP | H02-5735 | 1/1990 |

OTHER PUBLICATIONS

Abstract of "Notification of Reason(s) for Refusal"—Examiner Yoshihiko Seiki, dated Aug. 9, 2000; patent application No. H11–063828.

* cited by examiner

Primary Examiner—Teresa Walberg
Assistant Examiner—Daniel Robinson
(74) Attorney, Agent, or Firm—Hogan & Hartson, L.L.P.

(57) ABSTRACT

There is provided an idling engine speed control apparatus which can economically and suitably control an idling engine speed in the case where a variable displacement type compressor with a variable displacement is mounted is a part of an automotive air conditioning system. A the time of idling, a duty ratio of a control valve current value sent as an external signal to a control valve is sent also to an engine controller, and the engine control apparatus controls the output of an engine on the basis of the duty ratio. For example, when the duty ratio becomes high from a small value, since the present operating state of the compressor is in the direction where the differential pressure becomes high and the displacement is increased, it is expected that a large load is applied to the engine. Thus, in this case, the engine output is controlled correspondingly to a large duty ratio and the idling engine speed is made high.

10 Claims, 6 Drawing Sheets

IDLING ENGINE SPEED CONTROL APPARATUS

BACKGROUND OF THE INVENTION

1. Field of the Invention

The present invention relates to an idling engine speed control apparatus of a vehicle, and particularly to an idling engine speed control apparatus which can economically and suitably control the idling engine speed in the case where a variable displacement type compressor with a variable displacement is mounted as a part of an automotive air conditioning system.

2. Description of the Related Art

An idling engine speed of a vehicle is changed by load change of an engine. For example, a variable displacement type compressor mounted for an automotive air conditioner is driven, its driving force is applied as a load to the engine, so that the idling engine speed is lowered.

Particularly, in the variable displacement type compressor, the displacement of a compression refrigerant gas is changed, and in the case where the compressor is driven in the state where the displacement is large, the load of the engine becomes high, and the idling engine speed is excessively lowered, which results in an engine stop.

In order to avoid such a disadvantage, in the period when the variable displacement type compressor is driven, idling up is made on the assumption that the displacement is maximum, and the idling engine speed is maintained. However, in such idling up, since the standard is the case where the displacement becomes maximum as described above, when the displacement is decreased and the engine load becomes low, the engine speed becomes high more than needs and the fuel efficiency becomes poor.

Then, in the case where this kind of variable displacement type compressor is used as a part of an automotive air conditioning system, in order to perform idling up in accordance with the increase or decrease of the displacement, the displacement is calculated according to, for example, a method (1) or (2) described below, and the output of the engine is adjusted on the basis of this calculation result to stabilize the idling engine speed.

(1) Attention is paid to the fact that there is a definite correlation between the displacement of the variable displacement type compressor and a position of a control mechanism part for controlling the displacement, and the position of the control mechanism part is detected so that the displacement is calculated.

(2) Attention is paid to the fact that there a definite correlation between a discharge pressure and the displacement, and the discharge pressure is detected so that the displacement is calculated.

According to the foregoing conventional control of idling engine speed, idling up in accordance with the increase or decrease of the displacement becomes possible from calculation of the displacement of the variable displacement type compressor and from adjustment of an engine output on the basis of the calculation result. However, since the displacement is calculated on the basis of the position of the control mechanism part or discharge pressure, a position detecting sensor of the control mechanism part or a discharge pressure detecting sensor is indispensable, so that the control cost becomes high by that, and the cost of the vehicle itself also becomes high. Besides, there is also a problem that when a poor operation occurs in this kind of sensor, accurate displacement can not be calculated, and it is impossible to perform suitable idling up in accordance with an engine load corresponding to the present displacement.

SUMMARY OF THE INVENTION

The present invention has been made in view of the above, and an object thereof is to provide an idling engine speed control apparatus which can economically and suitably control an idling engine speed in the case where a variable displacement type compressor with a variable displacement is mounted as a part of an automotive air conditioning system.

In order to achieve the foregoing object, according to a first aspect of the invention, in an idling engine speed control apparatus of a vehicle including a variable displacement type compressor in which a displacement is determined by a differential pressure between a control pressure and a suction pressure, an engine output at idling of the vehicle is controlled on the basis of an external signal for controlling the differential pressure, sent to a control valve for controlling the differential pressure.

According to a second aspect of the invention, the control pressure is controlled by adjustment of the control valve, the external signal for controlling the differential pressure is formed of a duty ratio of a control valve current value sent to the control valve, and the engine output at idling is controlled on the basis of the duty ratio.

According to the invention, the engine output at idling is controlled on the basis of the external signal for controlling the differential pressure of the variable displacement type compressor, and the idling engine speed is adjusted.

DETAILED DESCRIPTION OF THE PREFERRED EMBODIMENTS

An embodiment of an idling engine speed control apparatus of the invention will be described below in detail with reference to FIGS. 1 to 7.

A compressor mounted as a part of an automotive air conditioning system in a vehicle is roughly divided into a type where its displacement is changed and a type where its displacement is fixed. The idling engine speed control apparatus of this embodiment relates to a vehicle with a variable displacement type compressor in which the displacement is changed.

Figure 1:
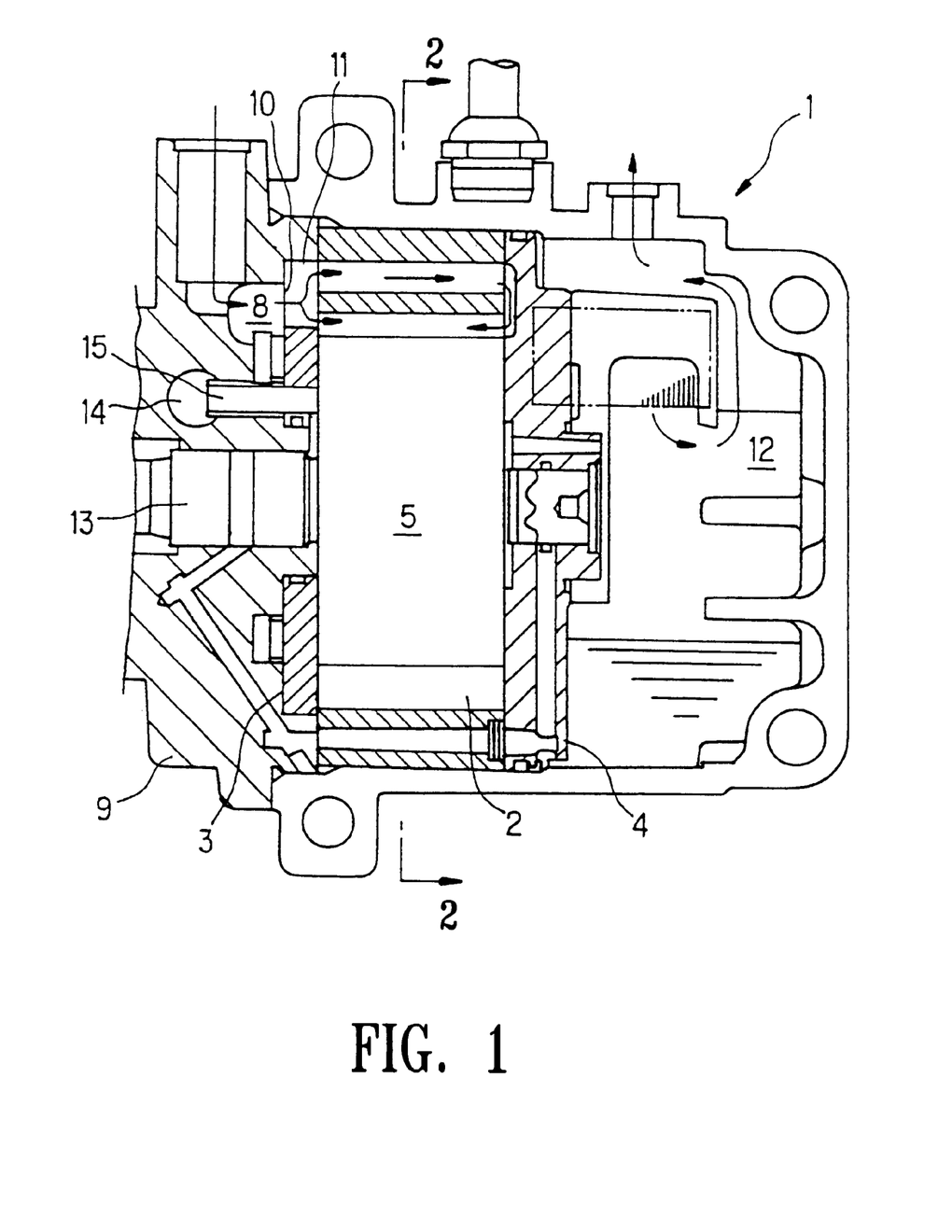
FIG. 1 is a sectional view of a compressor of a type where a displacement is controlled by a control plate.
Figure 2:
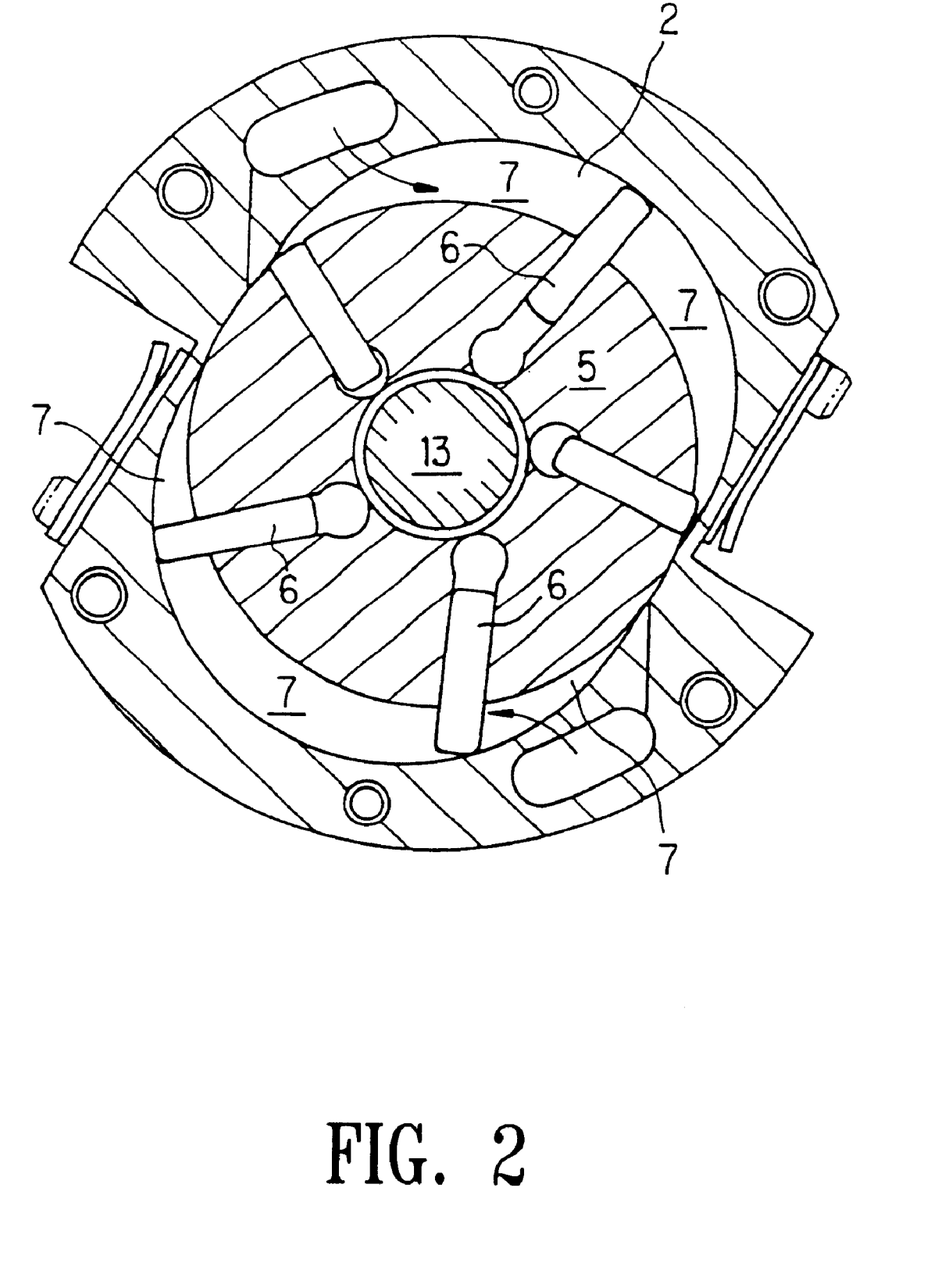
FIG. 2 is a sectional view of the compressor shown in FIG. 1 and taken along line 2—2.
Figure 3:
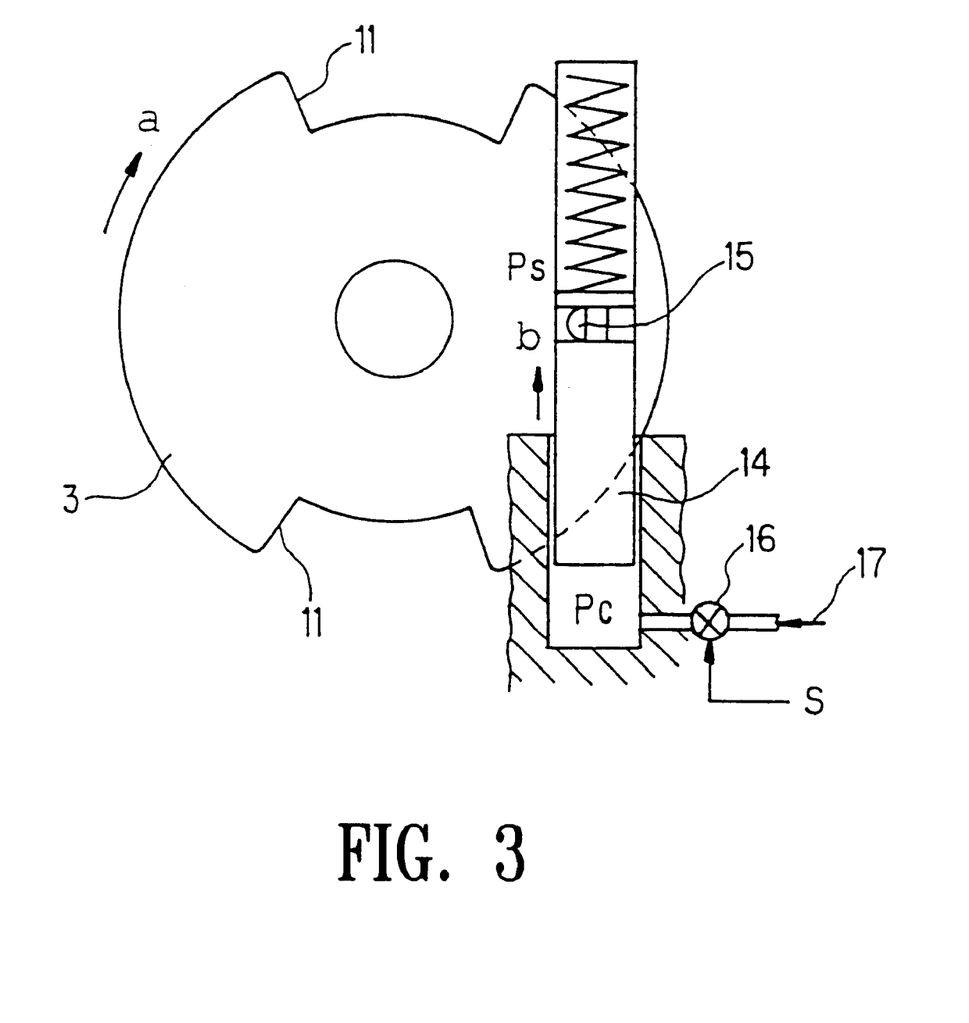
FIG. 3 is an explanatory view of a control mechanism of the displacement by the control plate in the compressor shown in FIG. 1.
Figure 4:
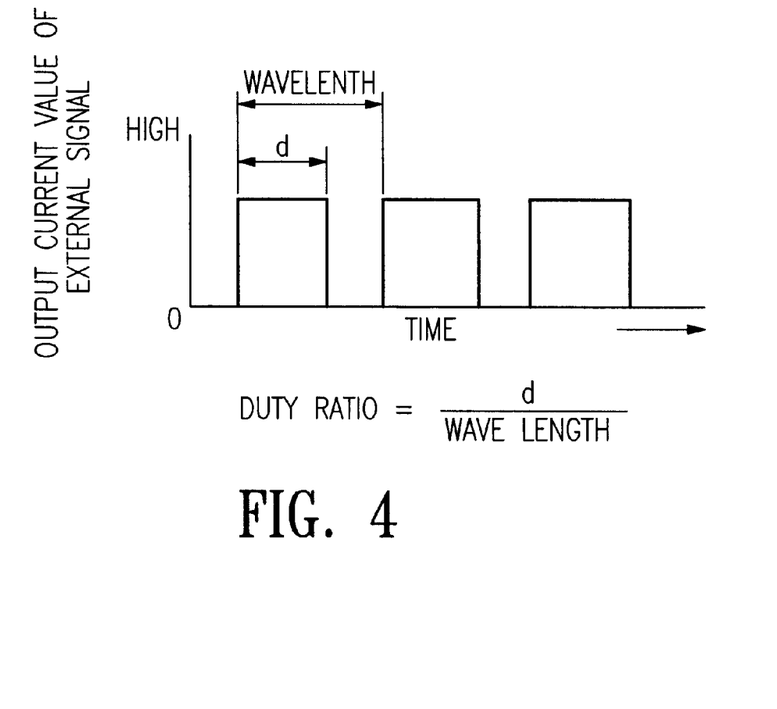
FIG. 4 is an explanatory view of a duty ratio of a control valve current value which is sent as an external signal to a control valve.

FIG. 1 is a sectional view of a compressor of a type where the displacement is controlled by a control plate, FIG. 2 is a sectional view of the compressor shown in FIG. 1 and taken along line 2—2, and FIG. 3 is an explanatory view of a control mechanism of the displacement by the control plate of the compressor shown in FIG. 1.

The outline of the variable displacement type compressor will be described with reference to these drawings. A compressor 1 shown in FIG. 1 includes a cylinder chamber 2 having an elliptical inner circumference. The cylinder chamber 2 is partitioned into a plurality of small chambers respectively called a compression chamber 7 by a surface or a control plate 3, an inner surface of a side block 4, an outer circumferential surface of a rotor 5, and both side surfaces of a vane 6 at the tip side. This compression chamber 7 repeats a change in volume by rotation of the rotor 5. At the time of an increase in the volume of the compression chamber 7, a low pressure refrigerant gas is sucked from the side of a suction chamber 8 to the side of the compression chamber 7 through a suction port 10 of a front head 9 and a notch portion 11 of the outer circumference of the control plate 3. At the time of a decrease in the volume of the compression chamber 7, the low pressure refrigerant gas is compressed in the compression chamber 7, and the high pressure refrigerant gas is discharged from the compression chamber 7 to the side of a discharge chamber 12.

The control plate 3 controls the displacement of such a high pressure refrigerant gas, and the control plate 3 is provided to be rotatable around a rotor shaft 13 within a specific angle. When the control plate 3 like this is rotated to the maximum in the clockwise direction as shown by an arrow "a" in the drawing, the displacement of the high pressure refrigerant gas is decreased. This is because in a relatively long period from the compression initial stage when the volume of the compression chamber 7 starts to change from the maximum to the minimum to the compression middle stage, the suction port 10 communicates with the side of the compression chamber 7 through the notch portion 11 of the outer circumference of the control plate 3, so that part of the low pressure refrigerant gas once sucked in the compression chamber 7 is discharged back to the side of the suction port 10 through the notch portion 11 by the volume decrease in the compression chamber 7, the so-called bypass effect occurs, and by this, the compression displacement of the low pressure refrigerant gas is decreased. When the control plate 3 starts to rotate in the counterclockwise direction from the position where the plate has rotated to the maximum in the clockwise direction, the foregoing back discharge amount of the low pressure refrigerant gas through the notch portion 11 is decreased in response to the rotation angle, the compression displacement of the low pressure refrigerant gas is increased by that, and the displacement of the high pressure refrigerant gas is increased.

Next, a rotating mechanism of the control plate 3 will be described. A plate driving shaft 14 is slidably provided at the inner side of the front head 9, and the control plate 3 is coupled with the tip side of the plate driving shaft 14 through a driving pin 15. A suction pressure Ps of the suction chamber 8 acts on the tip side of the plate driving shaft 14, and a control pressure Pc acts on the rear end of the plate driving shaft 14. When the control pressure Pc becomes high, and a differential pressure $\Delta P$ (Pc–Ps) between the control pressure Pc and the suction pressure Ps becomes high, the plate driving shaft 14 advances against the force of a spring in the direction indicated by an arrow "b" in the drawing, and this advancing movement is converted into the rotation movement of the control plate 3 through the driving pin 15, so that the control plate 3 is rotated in the counterclockwise direction. By this, as described above, the displacement of the high pressure refrigerant gas is increased. When the control pressure Pc becomes low from such a state and the differential pressure $\Delta P$ between the control pressure Pc and the suction pressure Ps becomes low, the plate driving shaft 14 is pressed back by the spring force and goes back, and as a result, the control plate 3 is rotated in the clockwise direction contrary to the above. By this, as described above, the displacement of the high pressure refrigerant gas is decreased.

Like this, in the compressor shown in FIG. 1, the displacement is determined by the intensity of the differential pressure $\Delta P$ between the control pressure Pc acting on the rear end of the plate driving shaft 14 and the suction pressure Ps of the suction chamber 8. In this case, the differential pressure $\Delta P$ is changed by the increase or decrease of the control pressure Pc, and the control pressure Pc is controlled by the operation of a control valve 16. Like this, although the differential pressure $\Delta P$ is controlled by the operation of the control valve 16, in this embodiment, a duty ratio (see FIG. 4) of a control valve current value sent to the control valve 16 is made an external signal S, and by changing the duty ratio as the external signal S, the control valve 16 is operated and the control pressure Pc is controlled.

Figure 5:
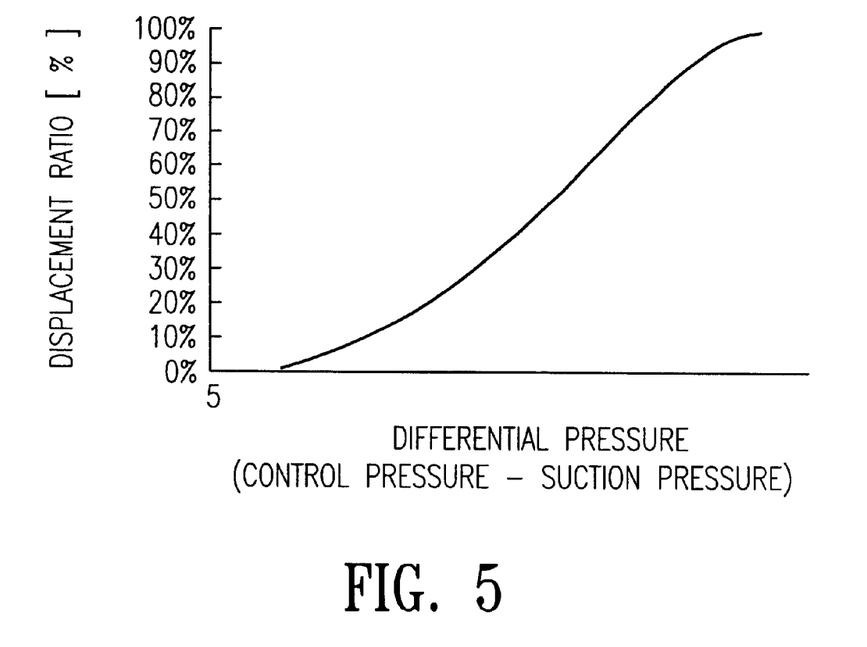
FIG. 5 is an explanatory view showing the relation between the differential pressure of the compressor and the displacement.
Figure 6:
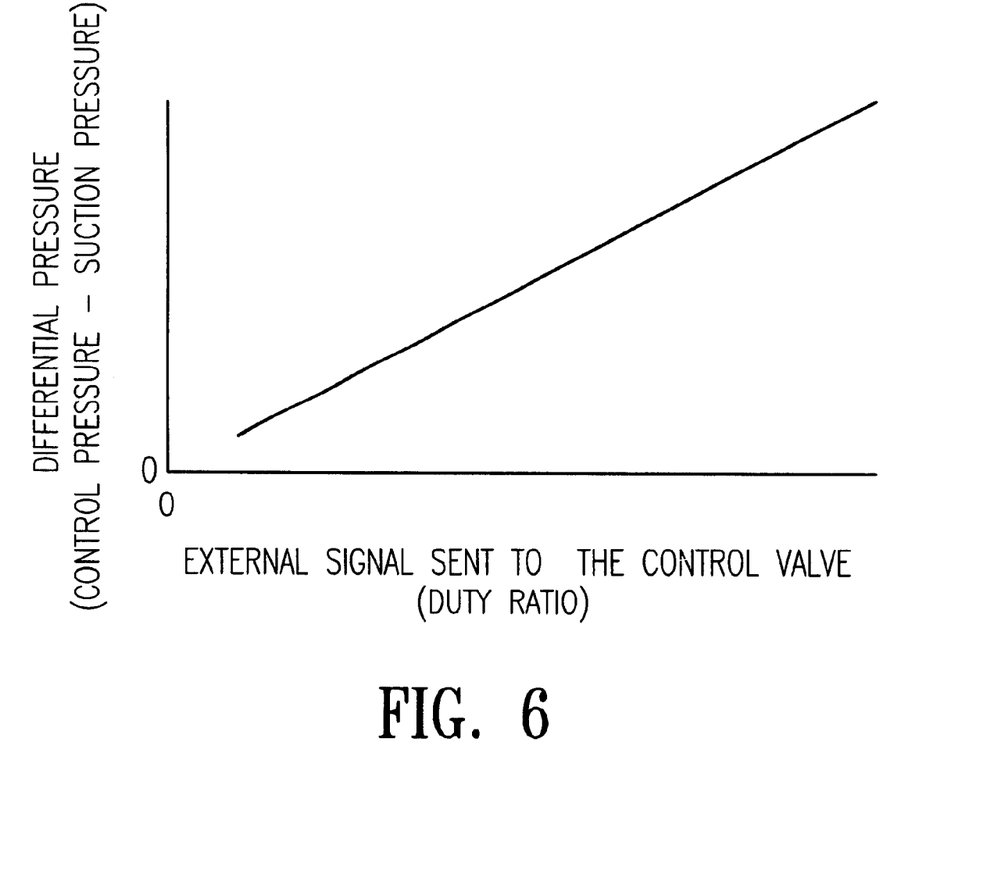
FIG. 6 is an explanatory view of the relation between the differential pressure of the compressor and the external signal sent to the control valve.

FIG. 5 shows the relation between the differential pressure $\Delta P$ and a displacement ratio (%) when the maximum displacement is made 100%. FIG. 6 shows the relation between the differential pressure $\Delta P$ and the external signal S sent to the control valve 16, that is, the duty ratio of the control valve current value. As is understood from these drawings, when the duty ratio of the control valve current value becomes large, an open time of the control valve 16 becomes long, and by this, a large amount of oil 17 corresponding to the discharge pressure of the high pressure refrigerant gas is supplied to the side of the rear end of the plate driving shaft 14 through the control valve 16, the control pressure Pc acting on the rear end of the plate driving shaft 14 becomes high, and the differential pressure $\Delta P$ to the suction pressure Ps becomes high. When the differential pressure $\Delta P$ becomes high like this, the displacement is increased as described above. On the other hand, when the duty ratio of the control valve current value becomes low, the open time of the control valve 16 becomes short, and by this, a supply amount of the oil 17 corresponding to the discharge pressure of the high pressure refrigerant gas and supplied to the rear end of the plate driving shaft 14 through the control valve 16 is decreased. Thus, the control pressure Pc acting on the rear end of the plate driving shaft 14 becomes low, and the differential pressure $\Delta P$ to the suction pressure Ps becomes low. Like this, when the differential pressure $\Delta P$ becomes low, the displacement is decreased as described above.

Figure 7:
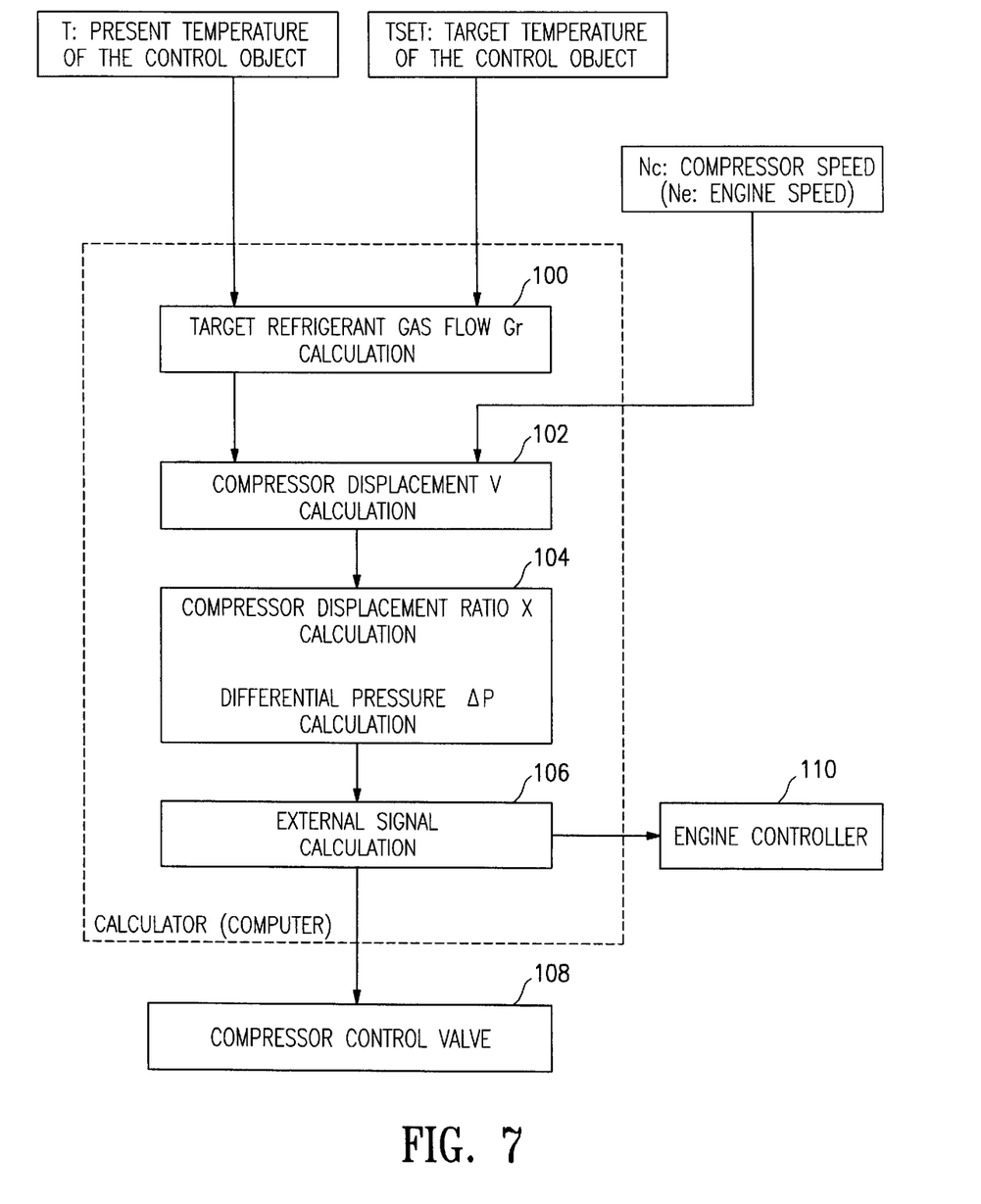
FIG. 7 is an operation explanatory view showing temperature control in a vehicle in which the compressor shown in FIG. 1 is mounted as apart of an air conditioning system, and an idling engine speed control apparatus of the invention.

Next, temperature control in a vehicle in which the compressor of the foregoing structure is mounted as a part of an air conditioning system, and engine speed control at idling will be described with reference to FIG. 7.

The temperature control is carried out as described below. First, on the basis of a target temperature Tset of a portion (the inside of a vehicle, etc.) to be controlled and a present temperature T at the identical portion, a target refrigerant gas flow amount Gr of the air conditioning system is calculated (step 100). Next, on the basis of the target refrigerant gas flow amount Gr of the calculation result, the displacement V of the compressor is calculated. Here, a description will be made on a case of T−Tset>0. In this case, in order to further cool the inside of the vehicle, the present refrigerant gas flow amount of the air conditioning system must be increased. For that purpose, it is necessary to relatively increase the displacement V of the compressor and to raise the cooling capacity. Then, by using a compressor revolution speed Nc, the compressor displacement V necessary to change the present refrigerant gas flow amount of the air conditioning system to the target refrigerant gas flow amount Gr is calculated (step 102), and the differential pressure ΔP to achieve the compressor displacement V is obtained by calculation from the relational expression of the solid line graph of FIG. 5 (step 104). Moreover, the duty ratio or the control valve current value to achieve the differential pressure ΔP is obtained from the relational expression of the solid line graph of FIG. 6. Then, the duty ratio of this calculation result is sent as the external signal S to the control valve 16 (step 106). By this, the control valve 16 is controlled (step 108), the control pressure Ps is raised, and the plate driving shaft 14 advances. Further, the advancing movement of the plate driving shaft 14 is converted into the rotation movement of the control plate 3 through the driving pin 15, the control plate 3 is rotated in the counterclockwise direction, and the compressor displacement is increased, as described above.

Next, engine speed control at the time of idling will be described. This is carried out as described below. In this embodiment, at the time of idling, the duty ratio of the control valve current value as the external signal S as described above is also sent to an engine controller (step 106). Here, the engine controller controls the output of the engine on the basis of the duty ratio (step 110).

Specifically, as is understood from FIG. 5 and FIG. 6, when the duty ratio becomes high from a small value, since the present operating state of the compressor is in the direction where the differential pressure ΔP becomes high and the displacement is increased, it is expected that a large load is applied to the engine. Thus, in this case, the engine output is controlled correspondingly to a large duty ratio, and the idling engine speed is made constant.

On the other hand, when the duty ratio becomes small from a high value, since the present compressor operating state is in the direction where the differential pressure ΔP becomes low and the displacement is decreased, it is expected that a load applied to the engine is decreased. Thus, in this case, the engine output is controlled correspondingly to a small duty ratio, and the idling engine speed is made constant.

Incidentally, with respect to the control of the idling engine speed, the compressor displacement V of the calculation result at step 102 is sent to the engine controller, and the engine output may be controlled on the basis of this compressor displacement V.

As described above, in the idling engine speed control apparatus of this embodiment, on the basis of the duty ratio as the external signal S for controlling the differential pressure of the variable displacement type compressor 1, the engine output at the time of idling of a vehicle is controlled. Thus, it becomes possible to control the idling engine speed without using a position detecting sensor for parts of a displacement control mechanism or a discharge pressure detecting sensor conventionally used in the control of idling engine speed. Since these sensors can be omitted, the control cost can be made inexpensive, and the cost of the vehicle itself can be reduced. Moreover, deterioration in control of idling up due to the poor operation of this kind of sensor does not occur, and suitable idling up in response to an engine load corresponding to the displacement can be performed.

As described above, in the idling engine speed control apparatus of the present invention, attention is paid to the differential pressure of the variable displacement type compressor, and on the basis of an external signal for controlling the differential pressure, the engine output of the vehicle at the time of idling of a vehicle is controlled. Thus, it becomes possible to control the idling engine speed without additionally using a position detecting sensor for parts of a displacement control mechanism or a discharge pressure detecting sensor as in the conventional apparatus. Thus, the cost can be reduced by the omission of these sensors, and there are effects that deterioration in control of idling up due to the poor operation of this kind of sensor does not occur, and suitable idling up in response to an engine load corresponding to the displacement can be performed.

What is claimed is:

1. An idling engine speed control apparatus of a vehicle including a variable displacement type compressor in which a displacement is determined by a differential pressure between a control pressure and a suction pressure, wherein an engine output at idling of the vehicle is controlled on the basis of an external signal for controlling the differential pressure, sent to a control valve for controlling the differential pressure, and wherein the engine output at idling of the vehicle is controlled neither on the basis of a detected pressure inside the compressor, nor on the basis of a detected physical position of a compressor control element.

2. An idling engine speed control apparatus according to claim 1, wherein the control pressure is controlled by adjustment of the control valve, the external signal for controlling the differential pressure is formed of a duty ratio of a control valve current value sent to the control valve, and the engine output at idling is controlled on the basis of the duty ratio.

3. Engine idle speed control apparatus comprising:

a variable displacement type compressor configured to draw power from the engine, the displacement of the compressor being controlled by a differential pressure between a control pressure and a suction pressure;

a control valve operable to control the differential pressure;

signal apparatus operable to supply a control signal to the control valve to control the control valve; and engine speed control apparatus operable to control the speed of the engine based on the external signal and not based on either of a detected pressure inside the compressor or a detected physical position of a compressor control element.

4. The apparatus of claim 3, wherein the signal apparatus is operable to supply to the control valve a control signal corresponding to a duty ratio for the control valve, and wherein the engine speed control apparatus is operable to control the speed of the engine based on the duty ratio.

5. Engine idle speed control apparatus comprising:

a variable displacement type compressor configured to draw power from the engine, wherein the displacement of the compressor is controlled by the position of a control element, the position of which controls the extent of a back discharge within the compressor, and wherein the position of the control element is controlled by a differential pressure between a control pressure and a suction pressure;

a control valve operable to control the differential pressure;

signal apparatus operable to supply a control signal to the control valve to control the control valve; and engine speed control apparatus operable to control the speed of the engine based on the external signal and not based on either of a detected pressure inside the compressor or a detected physical position of a compressor control element.

6. The apparatus of claim 5, wherein the signal apparatus is operable to supply to the control valve a control signal corresponding to a duty ratio for the control valve, and wherein the engine speed control apparatus is operable to control the speed of the engine based on the duty ratio.

7. A method for controlling the speed of an engine, the method comprising:

supplying power from the engine to a variable displacement compressor;

operating a control valve based on a control signal to control a differential pressure between a control pressure and a suction pressure to control the displacement of the compressor; and operating a speed control apparatus to control the speed of the engine based on the control signal and not based on either of a detected pressure inside the compressor or a detected physical position of a compressor control element.

8. The method of claim 7, wherein the control signal corresponds to a duty ratio for the control valve.

9. A method for controlling the speed of an engine, the method comprising:

supplying power from the engine to a variable displacement compressor;

operating a control valve based on a control signal to control a differential pressure between a control pressure and a suction pressure;

controlling the differential pressure to control a position of a control element;

controlling the position of the control element to control the extent of a back discharge within the compressor;

controlling the extent of the back discharge within the compressor to control the displacement of the compressor; and operating a speed control apparatus to control the speed of the engine based on the control signal and not based on either of a detected pressure inside the compressor or a detected physical position of a compressor control element.

10. The method of claim 9, wherein the control signal corresponds to a duty ratio for the control valve.

* * * * *